United States Patent
Teden

(10) Patent No.: US 10,413,459 B2
(45) Date of Patent: Sep. 17, 2019

(54) WHEELCHAIR ACCESSIBLE VEHICLE ASSEMBLY

(71) Applicant: Jeffrey Teden, Springfield, MA (US)

(72) Inventor: Jeffrey Teden, Springfield, MA (US)

(*) Notice: Subject to any disclaimer, the term of this patent is extended or adjusted under 35 U.S.C. 154(b) by 3 days.

(21) Appl. No.: 15/878,166

(22) Filed: Jan. 23, 2018

(65) Prior Publication Data
US 2019/0224056 A1    Jul. 25, 2019

(51) Int. Cl.
*A61G 3/06* (2006.01)
*B60P 1/44* (2006.01)

(52) U.S. Cl.
CPC ............ *A61G 3/062* (2013.01); *B60P 1/4442* (2013.01)

(58) Field of Classification Search
CPC .............................. A61G 3/062; B60P 1/4442
See application file for complete search history.

(56) References Cited

U.S. PATENT DOCUMENTS

| | | |
|---|---|---|
| 3,913,759 A | 10/1975 | Deacon |
| 5,674,043 A | 10/1997 | Dorn |
| D440,728 S | 4/2001 | Schlangen |
| 6,435,804 B1 * | 8/2002 | Hutchins ............... B60P 1/4414 187/200 |
| 6,726,435 B1 | 4/2004 | Williams et al. |
| 7,594,556 B1 * | 9/2009 | Panzarella ............ A61G 3/0209 180/167 |
| 8,998,558 B2 | 4/2015 | Kitchin et al. |
| 2007/0183881 A1 * | 8/2007 | O'Leary ............... B60P 1/4442 414/546 |
| 2018/0193210 A1 * | 7/2018 | Aitchison .............. A61G 3/066 |

* cited by examiner

*Primary Examiner* — Saul Rodriguez
*Assistant Examiner* — Ashley K Romano

(57) ABSTRACT

A wheelchair accessible vehicle assembly includes a vehicle that has a plurality of entries. Each of the entries is large enough to have a wheelchair pass therethrough for transporting an individual in the wheelchair. A plurality of wheelchair lifts and each of the wheelchair lifts is coupled to the vehicle. Each of the wheelchair lifts can lift and lower the wheelchair and each of the wheelchair lifts is aligned with one of the entries. In this way the plurality of wheelchair lifts facilitates a plurality of wheelchairs to be simultaneously lifted and lowered.

5 Claims, 3 Drawing Sheets

WHEELCHAIR ACCESSIBLE VEHICLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to wheelchair devices and more particularly pertains to a new wheelchair device for simultaneously lifting and lowering a plurality of wheelchairs into a vehicle.

BRIEF SUMMARY OF THE INVENTION

An embodiment of the disclosure meets the needs presented above by generally comprising a vehicle that has a plurality of entries. Each of the entries is large enough to have a wheelchair pass therethrough for transporting an individual in the wheelchair. A plurality of wheelchair lifts and each of the wheelchair lifts is coupled to the vehicle. Each of the wheelchair lifts can lift and lower the wheelchair and each of the wheelchair lifts is aligned with one of the entries. In this way the plurality of wheelchair lifts facilitates a plurality of wheelchairs to be simultaneously lifted and lowered.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
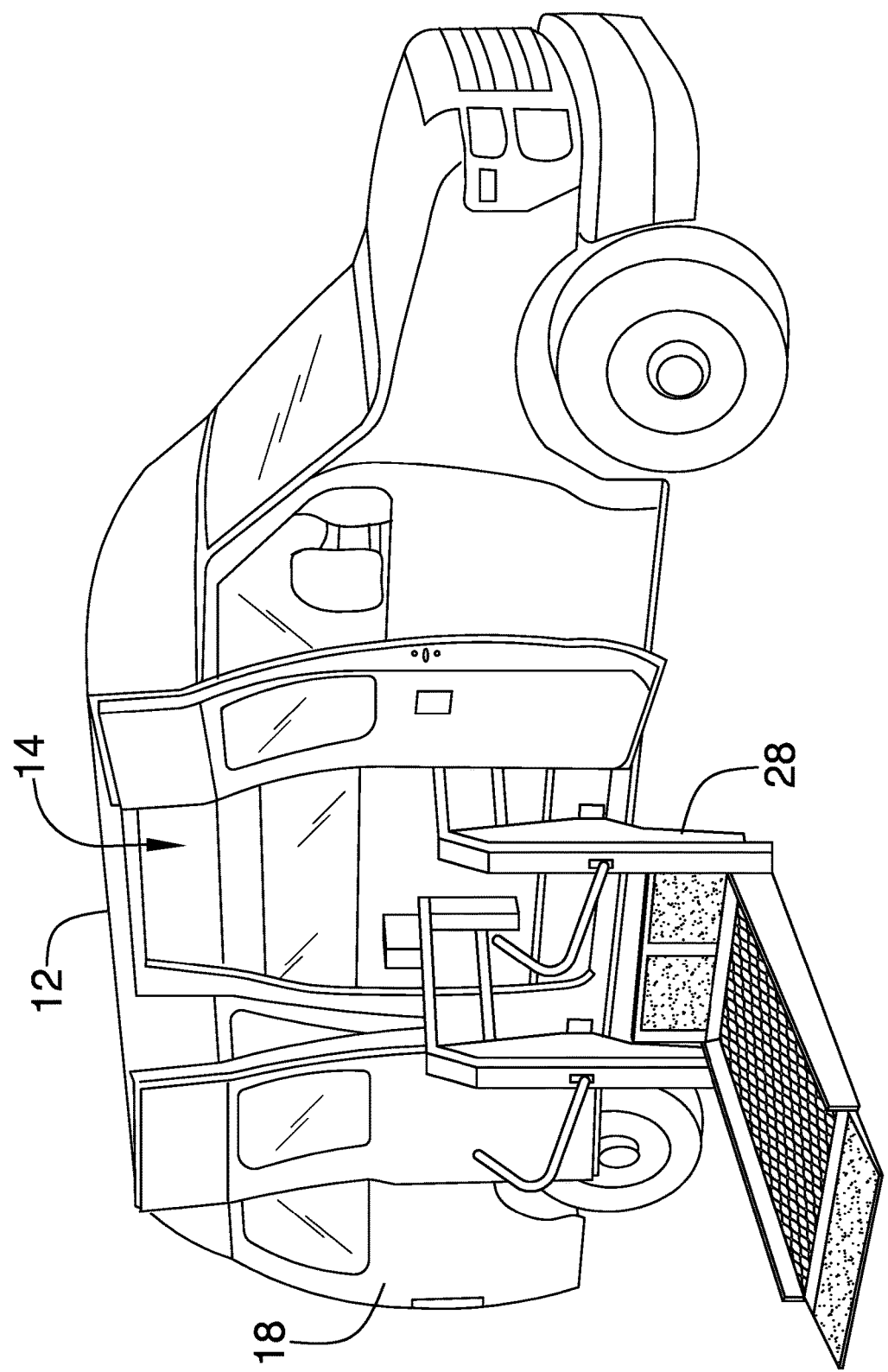
FIG. 1 is a perspective view of a wheelchair accessible vehicle assembly according to an embodiment of the disclosure.
Figure 2:
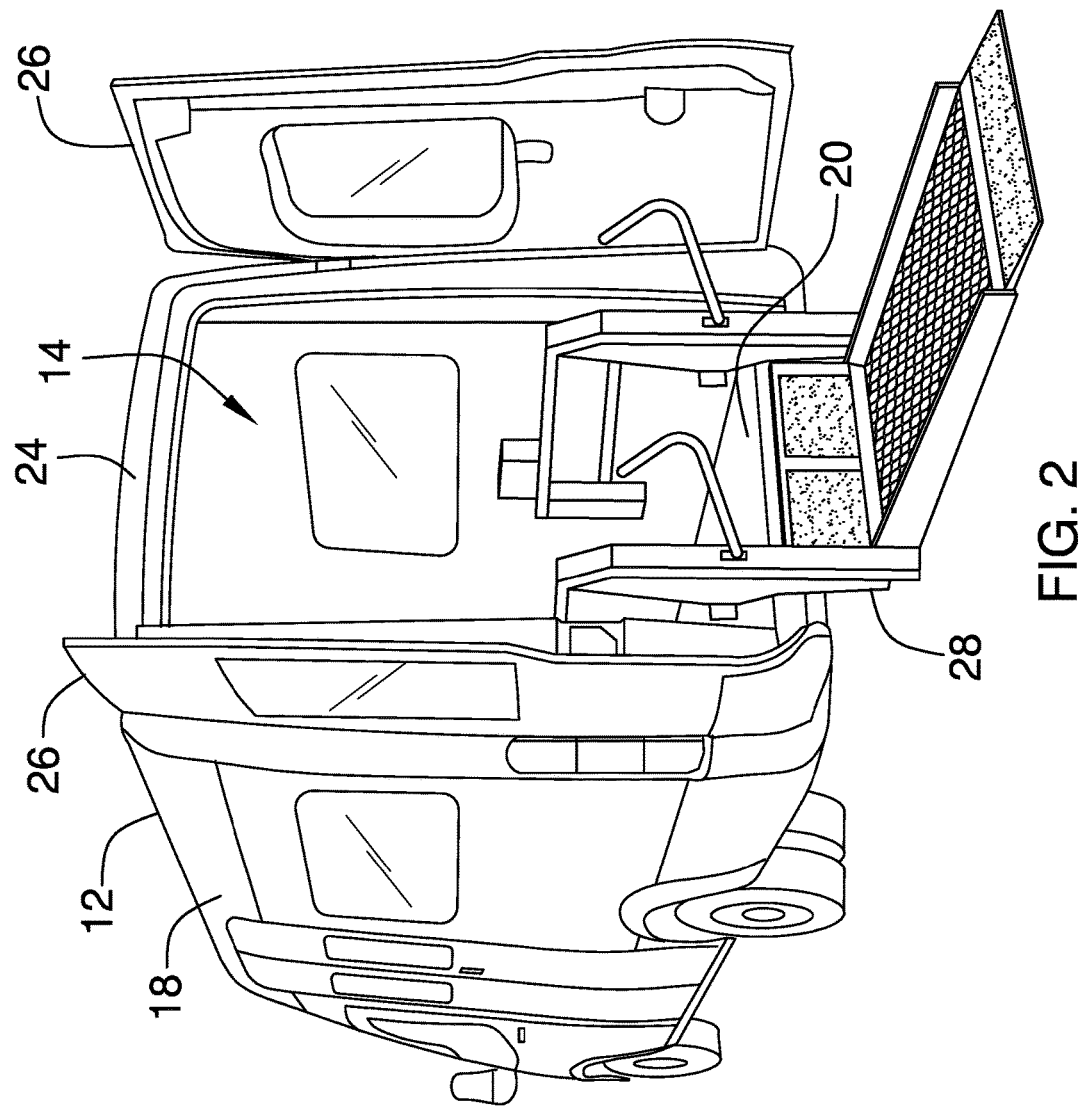
FIG. 2 is a back perspective view of an embodiment of the disclosure.
Figure 3:
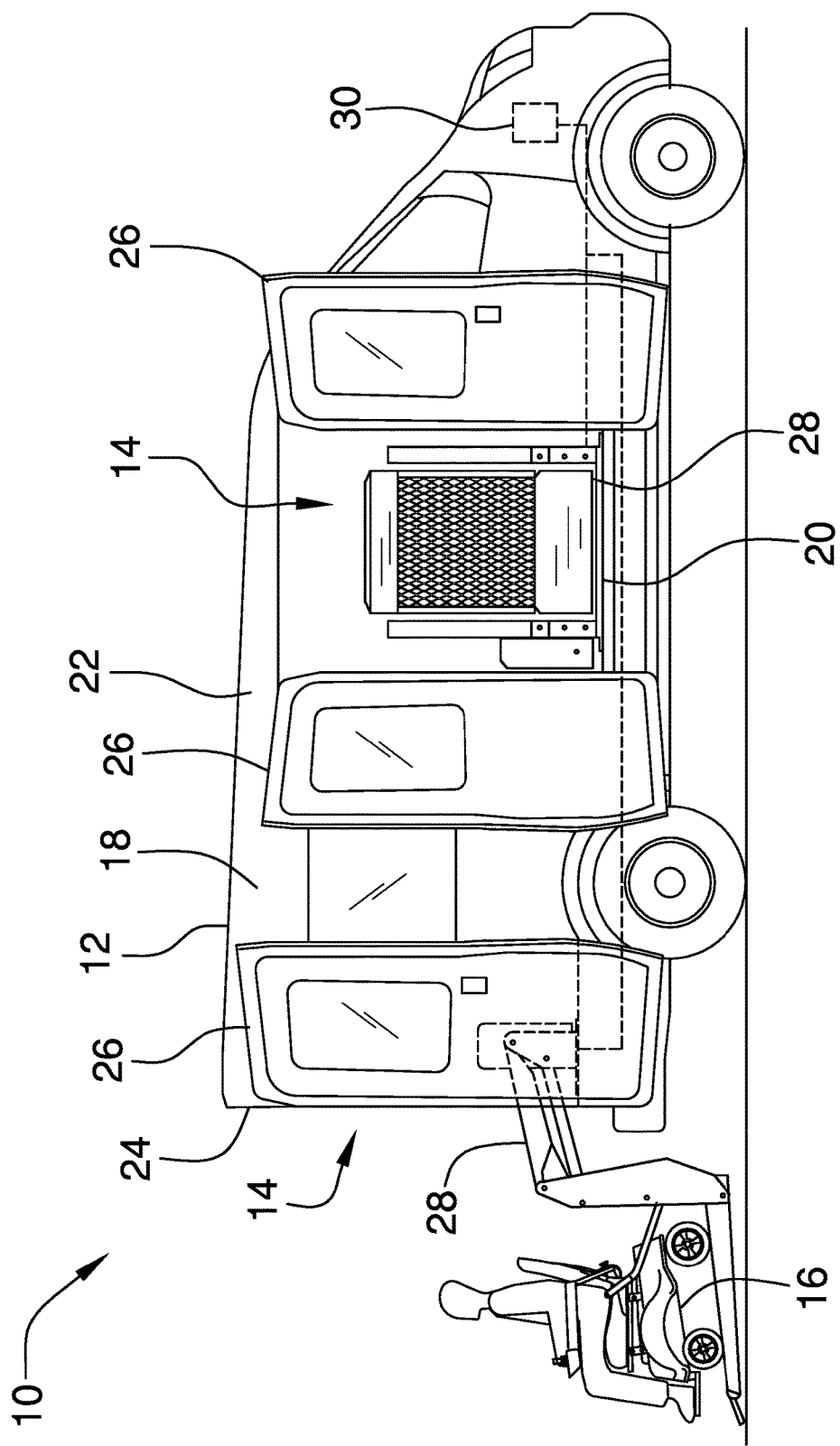
FIG. 3 is a right side view of an embodiment of the disclosure.

With reference now to the drawings, and in particular to FIGS. 1 through 3 thereof, a new wheelchair device embodying the principles and concepts of an embodiment of the disclosure and generally designated by the reference numeral 10 will be described.

As best illustrated in FIGS. 1 through 3, the wheelchair accessible vehicle assembly 10 generally comprises a vehicle 12 that has a plurality of entries 14. Each of the entries 14 is a double door entry such that a wheelchair 16 may pass therethrough for transporting an individual in a wheelchair 16. The wheelchair 16 may be an electric wheelchair, a manual wheelchair and any other conventional type of wheelchair for disabled individuals. Moreover, the vehicle 12 may be a fleet vehicle of a commercial transportation company or a privately owned vehicle.

The vehicle 12 may be a van or the like that has adequate interior space to transport at least two wheelchairs 16. The vehicle 12 has an outer wall 18 and a floor 20 and the outer wall 18 has a first lateral side 22 and a back side 24. The first lateral side 22 has one of the entries 14 extending therethrough and the back side 24 has one of the entries 14 extending therethrough. Additionally, a plurality of doors 26 is provided for closing each of the entries 14.

A plurality of wheelchair lifts 28 is provided and each of the wheelchair lifts 28 is coupled to the vehicle 12 to lift and lower the wheelchair 16. Each of the wheelchair lifts 28 is aligned with one of the entries 14. In this way the wheelchair lifts 28 to facilitate a plurality of wheelchairs 16 to be simultaneously lifted and lowered for entering and exiting the vehicle 12. Additionally, one wheelchair 16 may be lowered while another wheelchair 16 is being lifted.

Each of the wheelchair lifts 28 is attached to the outer wall 18 of the vehicle 12. One of the wheelchair lifts 28 is aligned with the entry on the first lateral side 22 and one of the wheelchair lifts 28 is aligned with the entry on the back side 24. Each of the wheelchair lifts 28 is positionable in a deployed position having each of the wheelchair lifts 28 lying on the ground. Thus, each of the wheelchair lifts 28 is positioned to have the wheelchair 16 rolled thereon. Each of the wheelchair lifts 28 is positionable in a retracted position having each of the wheelchair lifts 28 being aligned with the floor 20 in the vehicle 12. Thus, the wheelchair lifts 28 positions the wheelchair 16 for rolling onto the floor 20 in the vehicle 12. Each of the wheelchair lifts 28 is electrically coupled to a power source 30 comprising an electrical system of the vehicle 12. Additionally, each of the wheelchair lifts 28 may be hydraulic wheel chair lifts such as is manufactured by Ricon Corporation, 1135 AVIATION Place, San Fernando Calif., 91340. Each of the wheelchair lifts 28 may be electrical wheel chair lifts such as is manufactured by BraunAbility, 631 West 11$^{th}$ Street, Winamac Ind., 46996.

In use, the vehicle 12 is driven for transporting individuals in wheelchairs 16. Each of the wheelchair lifts 28 is independently operated to lift and lower wheelchairs 16. In this way a plurality of wheelchairs 16 may be simultaneously loaded and unloaded from the vehicle 12. Additionally, one wheelchair 16 may be loaded while another wheelchair 16 is being unloaded. In this way the plurality of wheelchairs 16 enhances efficiency with respect to loading and unloading individuals in wheelchairs 16 from the vehicle 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheelchair accessible vehicle assembly comprising:
a vehicle having a plurality of entries wherein each of said entries is configured to have a wheelchair pass therethrough for transporting an individual in the wheelchair, said vehicle having an outer wall and a floor, said outer wall having a first lateral side and a back side, said first lateral side having one of said entries extending therethrough, said back side having one of said entries extending therethrough; and
a plurality of wheelchair lifts, each of said wheelchair lifts being coupled to said vehicle wherein each of said wheelchair lifts is configured to lift and lower the wheelchair, each of said wheelchair lifts being aligned with one of said entries wherein said plurality of wheelchair lifts is configured to facilitate a plurality of wheelchairs to be simultaneously lifted and lowered, each of said wheelchair lifts being attached to said outer wall of said vehicle, one of said wheelchair lifts being aligned with said entry on said first lateral side, one of said wheelchair lifts being aligned with said entry on said back side.

2. The assembly according to claim 1, wherein each of said wheelchair lifts is positionable in a deployed position having each of said wheelchair lifts lying on the ground wherein each of said wheelchair lifts is configured to have a wheelchair rolled thereon.

3. The assembly according to claim 2, wherein each of said wheelchair lifts is positionable in a retracted position having each of said wheelchair lifts being aligned with said floor in said vehicle wherein said wheelchair lifts is configured to position the wheelchair for rolling onto said floor.

4. The assembly according to claim 1, wherein each of said wheelchair lifts is electrically coupled to a power source comprising an electrical system of said vehicle.

5. A wheelchair accessible vehicle assembly comprising:
a vehicle having a plurality of entries wherein each of said entries is configured to have a wheelchair pass therethrough for transporting an individual in the wheelchair, said vehicle having an outer wall and a floor, said outer wall having a first lateral side and a back side, said first lateral side having one of said entries extending therethrough, said back side having one of said entries extending therethrough; and
a plurality of wheelchair lifts, each of said wheelchair lifts being coupled to said vehicle wherein each of said wheelchair lifts is configured to lift and lower a wheelchair, each of said wheelchair lifts being aligned with one of said entries wherein said plurality of wheelchair lifts is configured to facilitate a plurality of wheelchairs to be simultaneously lifted and lowered, each of said wheelchair lifts being attached to said outer wall of said vehicle, one of said wheelchair lifts being aligned with said entry on said first lateral side, one of said wheelchair lifts being aligned with said entry on said back side, each of said wheelchair lifts being positionable in a deployed position having each of said wheelchair lifts lying on the ground wherein each of said wheelchair lifts is configured to have a wheelchair rolled thereon, each of said wheelchair lifts being positionable in a retracted position having each of said wheelchair lifts being aligned with said floor in said vehicle wherein said wheelchair lifts is configured to position the wheelchair for rolling onto said floor, each of said wheelchair lifts being electrically coupled to a power source comprising an electrical system of said vehicle.

* * * * *